SEMI-CONDUCTOR BARRIER LAYER SYSTEM

Filed March 25, 1958 2 Sheets-Sheet 1

INVENTORS
AUGUSTINUS ALOYSIUS ANTONIUS MARIA KOETS
PIETER WILLEM HAAIJMAN
JOHANNES JACOBUS ASUERUS PLOOS VAN AMSTEL
BY Frank R. Trifari
AGENT INVENTORS
AUGUSTINUS ALOYSIUS ANTONIUS MARIA KOETS
PIETER WILLEM HAAIJMAN
JOHANNES JACOBUS ASUERUS PLOOS VAN AMSTEL
BY
Frank R. Trifari
AGENT United States Patent Office 2,998,554

Patented Aug. 29, 1961

2,998,554

SEMI-CONDUCTOR BARRIER LAYER SYSTEM

Augustinus Aloysius Antonius Maria Koets, Mollenhutseweg, Nijmegen, and Johannes Jacobus Asuerus Ploos van Amstel and Pieter Willem Haaijman, Eindhoven, Netherlands, assignors to North American Philips Company, Inc., New York, N.Y., a corporation of Delaware Filed Mar. 25, 1958, Ser. No. 723,890

Claims priority, application Netherlands Apr. 5, 1957

12 Claims. (Cl. 317—234)

This invention relates to semi-conductor barrier layer systems, for example transistors or crystal diodes, provided with vacuum-tight envelopes which, at least in the surroundings of the semi-conductor systems, contain an active amount of water vapour. This invention also relates to methods for mounting such semi-conductive barrier layer systems in vacuum-tight envelopes.

As is known, the surface condition of a semi-conductor system comprising a barrier layer system greatly affects the electrical properties of the barrier layer system. Thus, in a transistor, the current amplification factor is very sensitive to substances or gases adsorbed at the surface of the semi-conductive member. The term "current amplification factor," which hereinafter is also denoted $\alpha_{bc}$, as used herein is to be understood to mean the quantity which is defined by the equation $$\alpha_{bc}=\left(\frac{\Delta I_c}{\Delta I_b}\right)V_{ce}$$

where $\Delta I_c$ and $\Delta I_b$ represent the variations in the collector and base currents respectively, which are measured at a constant potential difference $V_{ce}$ between the emitter and collector contacts. The influence of water vapour on the physical properties of a germanium surface has been examined several times and described in the literature. From the Proceedings of the Institute of Radio Engineers, April 1956; volume 44, Number 4, pp. 494–503, it is known that by adsorption of water vapour at the surface of a germanium transistor the current amplification factor is considerably increased, while other properties, for example the collector breakdown voltage and the collector cut-off current, provided that the humidity is not made excessively large, are either improved also or deteriorated immaterially only.

However, experience has shown that, as will be seen from the above-mentioned article also, the stability of the known barrier layer systems, in which water vapour is adsorbed at the surface of the semi-conductive system, is unsatisfactory, that is to say, that the electrical properties of these barrier layer systems greatly deteriorate after use for some time and at high operating temperatures. This deterioration of, for example, the current amplification factor is particularly marked when the transistor is heavily loaded temporarily, for example, by a temperature increase to 85° C. or by a heavy electrical load. Therefore, a completely different stabilization process has been proposed in which the water vapour and any further adsorbed substances are removed from the surface as far as possible by heating the transistor during mounting to a high temperature, for example 140° C., in a vacuum for some hours. However, this process, which is known as "vacuum baking," has a disadvantage in that the high stability is obtained at the expense of the current amplification factor, which in this process drops from its high value found after final etching to a very low value. Furthermore, in this process, there is a technical difficulty in that the barrier layer system must be mounted in conditions which can hardly be maintained, that is to say, in a vacuum.

It is an object of the present invention to provide measures which can be taken without difficulty and ensure a high degree of stability of a barrier layer system provided with a vacuum-tight envelope at the various operating temperatures while retaining the favourable electrical properties, such as a high current amplification factor, a small cut-off or saturation current or a high breakdown voltage, which such a barrier layer system can exhibit in a water vapour environment. It is a particular object of the invention to provide a transistor having a vacuum-tight envelope which combines a high current amplification factor with a high stability.

The invention utilizes the known effect that water vapour has a favourable influence on a number of semi-conductive barrier layer systems, for example the systems in which the semi-conductor is germanium. However, the invention also provides a better understanding of the causes of the instability of the known semi-conductive barrier layer systems which are not treated in a vacuum.

The invention is based inter alia on the recognition that this instability is largely due to a decrease with time of the operative water vapour content within the envelope, more particularly in the environment of the semi-conductive system. The cause of this decrease is assumed to be the presence of component parts within the envelope or of the envelope itself which absorb water vapour or react with water vapour, such as glass or metal parts or a filler, which withdraw the operative water vapour from the surroundings of the semi-conductive system at a low rate in normal operation, but at a higher rate by reaction under certain conditions, for example by heating.

According to the invention, in a semi-conductive barrier layer system provided with a vacuum-tight envelope which, at least in the surroundings of the semi-conductive system, contains an operative amount of water vapour, there is also provided within the envelope a depot or source of water in the bound state and this depot has a large relative quantity of water with respect to any reactions of water with or adsorption of the water by other parts within the envelope or of the envelope itself. Obviously, the term "operative quantity of water vapour" is used herein to denote an amount of water vapour which may be different with different semi-conductors but is sufficient to exert a favourable influence on at least one of the electrical properties of the barrier layer system. The term "water depot" or source is used herein to denote a substance to which an amount of water is bound and which, when the operative water vapour content in the said surrounding decreases, is capable of supplying water vapour, but is also capable of absorbing water under certain conditions, for example at a drop in temperature, and consequently of exerting a stabilizing influence upon the operative water vapour content within the envelope. The term "large relative quantity of water" is to be understood to mean an amount such that for a prolonged period of time, that is to say, throughout the life of the barrier layer system, the water depot contains a sufficient amount of water to compensate for the losses.

Preferably, the water depot consists of a substance to which or in which an amount of water is bound and which at an increase in temperature yields water vapour to counteract the evaporation of water from the semi-conductor surface and, at a subsequent decrease in temperature, absorbs an equal amount of water, or, if water vapour has been withdrawn by adsorption or reaction, adsorbs an amount of water such that, after a complete temperature cycle, the original relative humidity in the surroundings is restored. Further, the water depot is designed so that at the various operating temperatures a favourable relative huimidity is maintained in the said surroundings.

Barrier layer systems provided with vacuum-tight envelopes containing a water depot in accordance with the invention can be operated at a high temperature for a prolonged period of time, for example for 1000 hours, without an appreciable change in the electrical properties.

Obviously, the relative humidity of the environment of the semi-conductor system must be kept within the limits in which the water vapour acts favourably. Not only must an excessive humidity be avoided in order to prevent conduction along the surface and the like, but also there must be produced in the said environment a degree of humidity such that the favourable influence of the water vapour on the semi-conductor surface is sufficiently perceptible. Obviously, these limits depend inter alia upon the semi-conductor used. For a barrier layer system the semi-conductor body of which consists of germanium, an upper limit for the admissible water vapour pressure can be given which is about 15 mms. of Hg at room temperature and increases with the temperature to a maximum of about 300 mms. at 85° C.; the lower limit at 85° C. is about 10 mms. of Hg for germanium. However, and this is a further important aspect of the invention, preferably and particularly at the high operating temperatures, a high water vapour pressure is avoided in order to reduce to a minimum any reactions between the semi-conductor and the water vapour at a high temperature and a high water vapour pressure. In a semi-conductive barrier layer system, the semi-conductive member of which consists of germanium, use is preferably made of a water depot which at 85° C. maintains a water vapour pressure of at least 20 mms. of Hg and at the most 100 mms. of Hg.

By a suitable choice of a substance having a favourable binding affinity with respect to water, any degree of humidity favourable to the semi-conductor used can be ensured by means of the depot. Substance containing water of hydration, so-called hydrates, such as zinc ammonium sulphate·$6H_2O$, nickel potassium sulphate·$6H_2O$, sodium bromide·$2H_2O$ or ammonium nickel sulphate·$6H_2O$ and the like, are particularly suited for use as a water depot. They may be mixed with a binder consisting of silico-organic polymers, a number of which are known under the names of "silicone vacuum grease" and "silicone oil" and are commercially available under the trademarks "Dow Corning DC7" and "Dow Corning 702," alternatively, they may be mixed with a filler, for example sand. However, if the substance concerned is chemically reactive with respect to the semi-conductive system, it is preferably separated therefrom by means of a porous wall which may consist of glass wool or asbestos.

In general, as water depot use can be made of substances which are capable of reversibly yielding and absorbing water and of maintaining a favourable water vapour pressure at the various operating temperatures. Suitable substances are a number of oxides together with their hydroxides, for example the system thallium hydroxide-thallium oxide or the system magnesium hydroxide-magnesium oxide, a number of aqueous solutions, for example an aqueous solution of calcium chloride or manganese chloride or phosphoric acid, and substances such as silica gel or silico-organic compounds, for example silicone vacuum grease, which have absorbed a sufficient amount of water. It is already known to provide silical gel or "silicone vacuum grease" in an envelope for a semi-conductor barrier layer system, but these substances were provided as dry as possible in order to exclude water from the surroundings of the semi-conductive member. However, when these substances are employed in a barrier layer system in accordance with the invention, they must have absorbed a sufficient amount of water prior to their provision. Thus, the known barrier layer system is distinguished from the barrier layer system in accordance with the invention in that, when it is heavily loaded, the water vapour content which, though slight, is inevitably present, is consumed in a short period of time, so that the electrical properties of such a system are highly variable.

The invention also relates to a method of mounting a barrier layer system in a vacuum-tight envelope, a water depot being provided within the envelope prior to sealing.

In order that the invention may readily be carried out, some embodiments thereof will now be described, by way of example, with reference to the accompanying diagrammatic drawings, in which FIG. 1 is a longitudinal sectional view of a transistor provided with a vacuum-tight glass envelope and a water depot in accordance with the invention, FIG. 2 is a diagram which shows the variation of the current amplification factor of four transistors mounted without the use of the invention, in which the current amplification factor is plotted as the ordinate and the time during which the transistors are subjected to an endurance test in hours as the abscissa, as compared with the current amplification factor of a transistor in accordance with the invention.

Figure 1:
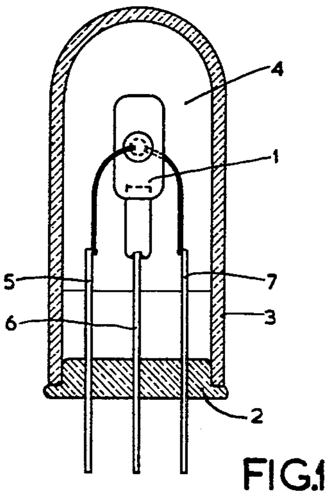

The germanium transistor 1 shown in FIG. 1, the manufacture of which will be described more fully hereinafter, is mounted in a vacuum-tight glass envelope comprising two parts which are sealed to one another, a glass base 2 and a glass bulb 3. According to the invention, provision is made within the envelope of a water-depot 4 consisting of a mixture of "silicone vacuum grease" and a hydrate, for example, zinc ammonium sulphate·$6H_2O$. This mixture substantially fills the entire envelope. The electrodes of the transistor are connected to supply conductors 5, 6 and 7 which are brought out through the glass base 2.

The results obtained by the use of the invention will now be compared with the results obtained with known transistors in which the semi-conductor system proper was manufactured as follows:

A single crystal rod consisting of n-type germanium of 3 to 5 ohms-cm., is divided in discs of dimensions 2 x 3 x 0.25 mm. by sawing and grinding. The 2 x 3 mm. surfaces of these discs coincide with the crystallographic (111) plane. The discs are ground and subsequently etched to a thickness of about 150 microns in a solution consisting of an aqueous 48% HF-solution, a 66% aqueous solution of $HNO_3$ and $H_2O$ in a volume ratio 2:2:1, subsequently washed in deionized water and dried. Centrally of a 2 x 3 mm. surface of such a germanium disc, there is provided an emitter pellet of diameter approximately 400 microns which consists of pure indium and is secured to the germanium disc by heating for a short period of time. Simultaneously, there is provided eccentrically on the same surface a base terminal consisting of nickel to the end of which a small amount of solder consisting of a tin-antimony alloy (95% by weight of Sn, 5% by weight of Sb) is provided. On the opposite surface of the disc, an indium collector pellet of diameter 800 microns is centered with respect to the emitter pellet and likewise secured by short-time heating. Subsequently, the assembly is heated to 600° C. in an atmosphere consisting of hydrogen and nitrogen for about 10 minutes The base thickness of the alloy transistors thus produced proves to be about 30 microns. Subsequently, a supply wire is welded to the base contact plate and nickel supply wires are soldered to the emitter and collector electrodes. In an aqueous 40% NaOH-solution, the transistor is etched electrolytically for about 10 seconds, the collector being connected to the positive terminal and the negative terminal consisting of a platinum plate suspended in the etching bath. After being washed in hot de-ionized water and dried, the transistor can be mounted in a vacuum-tight envelope.

In order to check the stability of barrier layer system provided with a vacuum-tight envelope in accordance with the invention and to compare it with the stability of known systems produced without the use of the invention, a number of these semi-conductive systems are sealed together with different kinds of water depots in glass vacuum-tight envelopes, a smaller number being mounted in vacuum-tight envelopes without the use of the invention. In order to obtain clear indications of any changes at short notice, part of these mounted transistors were subjected to a heavy endurance test, which consisted of prolonged heating at 85° C. without the use of an electrical load, another part being subjected to a different heavy endurance test which consisted of prolonged heating at 50° C. and the simultaneous imposition of an electrical load of 50 milliwatts (collector-base voltage 10 volts; collector current 5 milliamperes). Both endurance tests were interrupted for short intervals after periods of 100 hours, 500 hours and 1000 hours, so that the transistors could be cooled to room temperature and at room temperature a number of quantities of the transistors, for example current amplification factor, cut-off or saturation current and noise, could be checked.

Figure 2:
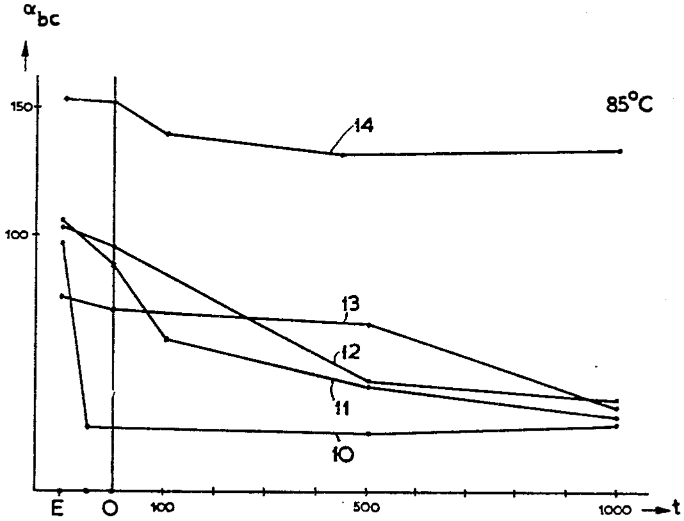
Figure 3:
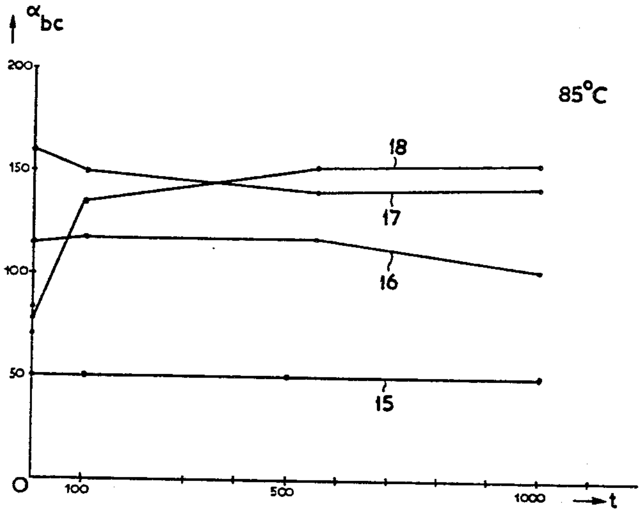
FIGURES 3 and 4 are similar diagrams relating to various transistors in accordance with the invention.
Figure 4:
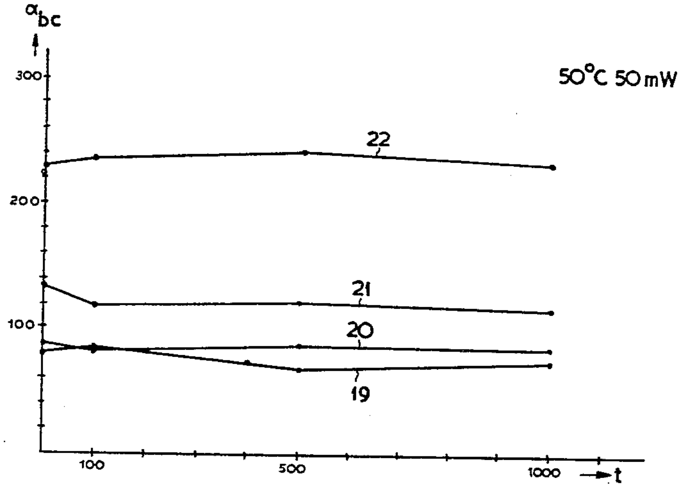

FIGURES 2 to 4 show the measurements of the amplification factor obtained in these tests. The measurements of the noise and the cut-off current, which both proved to be extremely low and hardly variable, are not shown. For clearly indicating which measuring points relate to a certain transistor, the points associated with a single transistor are joined by straight lines. In all these figures, the beginning of the endurance test is indicated by the time O; FIG. 2 also shows a measurement made prior to this instant of the value of the current amplification factor after final etching at the time E.

The transistor to which the characteristic 10 of FIG. 2 relates and which, after final etching, had a current amplification factor of 97, was heated in a vacuum at 145° C. for 3 hours and subsequently sealed in the glass envelope in this completely dry state. Owing to this vacuum baking, the current amplification factor dropped to 25, that is to say, to about ¼ of its initial value. Subsequently, the transistor was subjected to the endurance test at 85° C. As will be seen from the characteristic 10, this transistor, which was mounted in a known manner without the use of the invention, had a very good stability; however, the current amplification factor was very low.

Characteristic 11 of FIG. 2 relates to a transistor the current amplification factor of which was about 106 after final etching and which, in a vacuum-tight glass envelope, was surrounded in known manner by "silicone vacuum grease", which previously was dried at 100° C. for some time. After the sealing-in process, the current amplification factor was found to have dropped to 89. During the subsequent endurance test at 85° C., the current amplification factor dropped steadily, so that it was only 30 after 1000 hours. The stability of this transistor, which was mounted in known manner without the use of the invention, was particularly bad. After 1000 hours, the glass envelope was broken open and the transistor together with the enveloping "silicone vacuum grease" brought into air having a relative humidity of 60% at room temperature, with the result that the current amplification factor gradually rose again to 96 and thus substantially reassumed its original value. This behaviour justifies the assumption that the drop of the current amplification factor during the endurance test was due to a gradual decrease of the water content at the semi-conductor surface. The same is proved by the behaviour of the transistors to which the characteristics 12 and 13 of FIG. 2 relate.

The characteristic 12 of FIG. 2 relates to a transistor the current amplification factor of which was 104 after final etching. Prior to sealing, the envelope of this transistor was filled with air having a relative humidity of 82%. Owing to the sealing process, the current amplification factor dropped to 96. Subsequently, the transistor was subjected to the endurance test at 85° C.; during the first 500 hours, the current amplification factor dropped to 43, and it fell off slightly only to 37 during the second period of 500 hours. Consequently, the stability of this transistor, which was mounted without the use of the invention, was bad, particularly during the first period of 500 hours, while during the second 500 hours' period the current amplification factor was only about one third of the initial value. After the endurance test, the transistor envelope was broken open and the transistor was brought to room temperature in surroundings consisting of air having a relative humidity of about 60%. As a result, the current amplification factor rose almost immediately to 98, and this value is substantially equal to the initial value.

The characteristic 13 of FIG. 2 relates to a transistor the current amplification factor of which was 76 after final etching and which was sealed in the vacuum-tight envelope after this had been filled with air having a relative humidity of about 81%. Subsequent to sealing-in, the current amplification factor was 71 and this high value was maintained during the first 500 hours' period of the endurance test at 85° C. After 1000 hours, the current amplification factor had dropped to 34. Thus, this transistor, which was mounted without the use of the invention, proved to be unstable in the long run. After the endurance test the envelope was broken open and the transistor was brought at room temperature into air having a relative humidity of about 60%, with the result that the current amplification factor immediately reassumed its initial value of 76. The higher stability of this transistor during the first 500 hours' period as compared with that shown by the characteristic 12 can be ascribed to the higher water vapour content initially contained in the envelope of this transistor.

Figure 5:
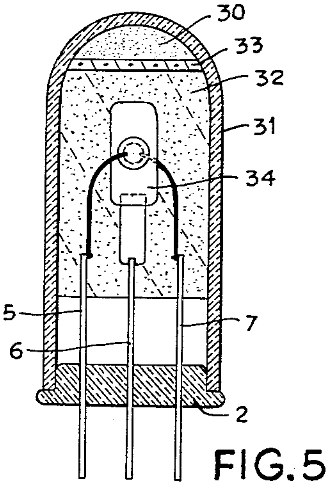
FIG. 5 is a cross-sectional view of a modification.

The transistor to which characteristic 14 of FIG. 2 relates was mounted in a vacuum-tight envelope with the use of the invention. It is illustrated in FIG. 5. Prior to sealing, a water depot 30 consisting of 60 milligrams of barium chloride·$2H_2O$ was provided in the closed end of the bulb 31. The remaining space in the bulb around the transistor was filled with "silicone vacuum grease" 32 and separated from the water depot 30 by means of a porous wall 33 consisting of glass wool. Prior to the arrangement of the semiconductive system 34 in the envelope and the sealing of this envelope, the bulb containing the water depot and the "silicone vacuum grease" was stored at room temperature in air having a relative humidity of 60% for some time. The current amplification factor, which was 154 after final etching, was found to be 153 after the sealing-in process. Subsequently, this transistor in accordance with the invention was subjected to the endurance test at 85° C. During this heavy endurance test, the initial high value of the current application factor was retained. The stability of this transistor in accordance with the invention was materially higher than that of the transistors which were mounted without the use of the invention and are shown by the characteristics 11 to 13 of FIG. 2. In addition, this transistor was capable of withstanding the high temperature during the sealing-in process. Obviously, the absolute variations of the current amplification factor are greater in this transistor than in the vacuum-baked transistor according to characteristic 10, since the absolute value also of the current amplification factor in this transistor materially exceeds that of the vacuum-baked transistor. However, the changes produced, which can be largely attributed to measuring errors, are not of practical importance.

Characteristic 15 of FIG. 3 relates to a transistor in accordance with the invention, which was mounted in a vacuum-tight envelope which previously was filled for about ¾ with a mixture of 90% by weight of "silicone vacuum grease" and 10% by weight of the hydrate zinc ammonium sulphate·$6H_2O$. The current amplification factor, which was 59 after final etching, fell off slightly to 50 owing to the sealing-in process. In the endurance test at 85° C., this value did not change at all.

The transistor according to the invention to which characteristic 16 of FIG. 3 relates, was mounted in a vacuum-tight manner in an envelope which prior to sealing had been filled with a mixture of 90% by weight of "silicone vacuum grease" and 10% by weight of potassium cobalt sulphate·$6H_2O$. The current amplification factor, which after the final etching process was 138, was 112 after the sealing-in process. In the endurance test at 85° C., this high value was substantially retained.

Characteristic 17 of FIG. 3 shows the result of the endurance test at 85° C. as measured with respect to a transistor in accordance with the invention, the envelope of which was filled with sand to which 10 milligrams of the hydrate potassium nickel sulphate·$6H_2O$ was admixed. The current amplification factor, which after the final etching and sealing-in processes was 172 and 158 respectively, during the first 100 hours' period of the endurance test dropped to about 150, however, this high value proved to be very stable in the course of the endurance test.

The behaviour of a transistor in accordance with the invention the envelope of which was substantially entirely filled up with silica gel which had absorbed 2% by weight of water, is shown in FIG. 3 by characteristic 18. Owing to the high temperature to which the transistor was exposed during the sealing-in process, the current amplification factor dropped from 274 to 78 but during the first 100 hours of the endurance test, the effects of the high sealing-in temperature were apparently obviated by a supply of water from the depot so that the current amplification factor attained a value of about 140 which steadily increased to about 150 during the remainder of the test. This example shows that substances which have adsorbed a sufficient amount of water are also suitable as water depots. For a stable final value to be attained as soon as possible, such a transistor may, if required, be subjected, subsequently to the sealing-in process, to a stabilizing temperature treatment, for example, heating to 140° C. for 6 hours. Characteristic 19 of FIG. 4 relates to a transistor in accordance with the invention, which was mounted in a glass vacuum-tight envelope which previously had been filled with a mixture of 90% by weight of "silicone vacuum grease" and 10% by weight of the hydrate zinc ammonium sulphate·$6H_2O$. The current amplification factor, which after the final etching process was 84, after the sealing-in process was 81. During the endurance test at 50° C. with a simultaneous electrical load of 50 milliwatts the current amplification factor of this transistor mounted in accordance with the invention remained substantially constant.

The transistor in accordance with the invention to which the characteristic 20 of FIG. 4 relates, was also subjected to the same endurance test. This transistor was mounted in a glass vacuum-tight envelope containing a water depot which consisted of 35 milligrams of $$K_2SO_4Al_2(SO_4)_3 \cdot 24H_2O$$

and was separated from the semi-conductive system. The space surrounding the semi-conductive system was filled with "silicone vacuum grease" and separated from the water depot by means of a porous wall of glass wool. The current amplification factor, which was 90 after the final etching process, was 88 after the sealing process, and this value proved to be particularly constant in the course of the endurance test.

A high stability during the endurance test at 50° C. and an electrical load of 50 milliwatts was also exhibited by the transistor in accordance with the invention to which characteristic 21 of FIG. 4 relates. In the envelope of this transistor, provision was made of a water depot consisting of 60 milligrams of barium chloride·$2H_2O$ which was separated by a porous wall of glass wool from the semi-conductive system enclosed in "silicone vacuum grease."

The transistor to which characteristic 22 of FIG. 4 relates was mounted in accordance with the invention in a glass vacuum-tight envelope which was filled up with humid "silicone vacuum grease" which previously had been stored in a moist atmosphere having a relative humidity of 60% for 24 hours and had adsorbed about 1.6 milligrams of water per gram of "silicone vacuum grease." The current amplification factor, which was about 300 after the final etching process, dropped comparatively slightly, taking into consideration the high initial value, to 230 owing to the sealing-in process, and this very high value remained substantially constant during the endurance test at 50° C. with an electrical load of 50 milliwatts. This example shows that "silicone vacuum grease," which has adsorbed a sufficient amount of water, is also suitable as the water depot.

Finally, it should be noted that the invention obviously is not restricted to the embodiments of water depots or envelope structures described hereinbefore, nor to semi-conductive electrode systems mounted in the special way of the examples. Furthermore, its field of application is not restricted to semi-conductive barrier layer systems the semi-conductive member of which consists of germanium; it can be used with the same good results in mounting semi-conductive barrier layer systems in which use is made of any semi-conductor, one or more physical properties of which are favourably influenced by water vapour.

What is claimed is:

1. A semiconductor device comprising a vacuum-tight envelope containing an atmosphere including water vapor, a semi-conductive body and contacts thereto within said envelope and exposed to the atmosphere therewithin, said semiconductive body being constituted of a material at which improved properties are exhibited by the body and contacts in a water vapor atmosphere, and a source of bound water vapor within said envelope and containing sufficient water and capable of generating and absorbing water to maintain the water vapor atmosphere therewithin at which the improved properties are exhibited for a lifetime of use of such device.

2. A device as set forth in claim 1 wherein a porous wall member within the envelope separates the water vapor source from the semiconductive body and its contacts.

3. A transistor semiconductor device comprising a vacuum-tight envelope containing a water vapor atmosphere, a semiconductive body and contacts thereto forming a transistor within said envelope and the body having its surface exposed to the water vapor atmosphere, said semiconductive body being constituted of a material at which improved current amplification is exhibited by the transistor in a water vapor atmosphere, and a source of bound water vapor within said envelope and containing sufficient water and capable of reversibly generating and absorbing water to maintain the water vapor atmosphere within the envelope at which the improved properties are exhibited for a lifetime of use of such device.

4. A device as set forth in claim 3 wherein the source comprises a hydrate.

5. A device as set forth in claim 3 wherein said source contains an oxide-hydroxide mixture.

6. A device as set forth in claim 3 wherein said source comprises a mixture of an oxide and the reaction product of the said oxide and water.

7. A transistor device comprising a vacuum-tight envelope containing a water vapor atmosphere, a semiconductive body and contacts thereto forming a transistor within said envelope with the body surface exposed to the water vapor atmosphere within said envelope, said semiconductive body being constituted of germanium whereby the transistor exhibits improved current amplification when the body is exposed to a water vapor atmosphere, and a source of bound water vapor within said envelope and containing sufficient water and capable of reversibly generating and absorbing water to maintain the water vapor atmosphere within the envelope at which the improved current amplification is exhibited for a lifetime of use of such device.

8. A device as set forth in claim 7 wherein said water vapor atmosphere is maintained at 85° C. at a pressure between 10 and 300 mms. of mercury.

9. A device as set forth in claim 8 wherein the source comprises a silico-organic polymer containing absorbed water.

10. A device as set forth in claim 7 wherein the source comprises a substantially inert fill admixed with a water-containing substance.

11. A transistor semiconductor device comprising a vacuum-tight envelope containing a water vapor atmosphere at a pressure between 20 and 100 mms. of mercury at 85° C., a semiconductive body and contacts thereto forming a transistor within said envelope and exposed to the atmosphere within said envelope, said semiconductive body being constituted of germanium at which improved current amplification is exhibited by the transistor in a water vapor atmosphere, and a fill containing bound water within said envelope and adapted to maintain the water vapor atmosphere therewithin in the said pressure range whereby the improved amplification is exhibited.

12. A device as set forth in claim 11 wherein the fill comprises silicone vacuum grease containing absorbed water.

References Cited in the file of this patent

UNITED STATES PATENTS

| | | |
|---|---|---|
| 2,846,625 | Gustafson et al. | Aug. 5, 1958 |
| 2,858,356 | Setchell | Oct. 28, 1958 |
| 2,887,629 | Nijland et al. | May 19, 1959 |